Patented July 8, 1947

2,423,600

UNITED STATES PATENT OFFICE 2,423,600

ICE CREAM MANUFACTURING PROCESS AND PRODUCT THEREOF

Manfred Landers, New York, N. Y., assignor to Lanco Products Corporation, New York, N. Y., a corporation of New York No Drawing. Application December 14, 1944, Serial No. 568,208

10 Claims. (Cl. 99—136)

The present invention relates to the manufacture of ice cream and is more particularly concerned with improvement of the texture of ice creams, sherbets, ices and similar products.

When an ice cream mix or sherbet mix is converted into ice cream or sherbet by freezing and thereafter held at a low temperature, it tends to acquire a grainy texture. This undesirable change in texture occurs even when the ingredients of the mix have been finely subdivided, as by a homogenization treatment, and is apparently the result of the formation of ice crystals in or between the small particles of ingredients. The graininess of the ice cream tends to increase during storage due to growth of the ice crystals present in the frozen product. Improvement with respect to graininess in the frozen product has been obtained by incorporating a stabilizer in the mix before freezing but all such materials which have heretofore been employed for this purpose have left much to be desired, either because they do not sufficiently improve the texture or because of undesirable effects on other characteristics of the ice cream or because they reduce the yield or "overrun"; that is, the volume of ice cream obtained from a given amount of mix. It is essential that the stabilizing material be free from odor or taste as any material which would impart an odor or taste cannot be tolerated in ice creams or sherbets. The material must also be stable and not subject to decomposition or deterioration in contact with the other ice cream or sherbet ingredients during storage and shipment.

It is the general object of the present invention to provide an ice cream, sherbet, ice or the like having an improved texture with respect to its graininess or granular condition without adversely affecting the other characteristics of the ice cream.

A further object is to provide an ice cream stabilizing agent which will be free of the foregoing disadvantages and will meet the foregoing requirements.

A related object is to provide an improved ice cream mix which when frozen will be converted into ice cream of improved texture and with a satisfactory overrun of the frozen product.

A further object is to provide a stabilizing and texture-improving agent which may be supplied to the ice cream manufacturer in such condition that he may simply incorporate it in his conventional ice cream mix before freezing and thus produce the improvement in texture provided by the present invention.

A related object is the provision of an improved ice cream manufacturing process which will produce an ice cream of smooth and fine grained texture while at the same time providing a satisfactory overrun.

In accordance with the invention the improvement in the texture of the ice cream is attained by the inclusion in the ice cream mix before freezing of a water-soluble salt of carboxymethylcellulose. Carboxymethylcellulose is characterized by a chemical constitution in which a hydrogen of the methyl group of methylcellulose is replaced by a carboxyl group.

These cellulose derivatives may be prepared, in general, from any suitable form of cellulose, for example from a "chemical pulp" containing a high proportion of alpha cellulose and obtained from either wood or cotton linters, by treating the cellulose first with an alkali solution to form an alkali cellulose and then with an alkaline salt of a mono-halogenated acetic acid, such as chloroacetic acid. The product is recovered from the reaction mass by precipitation with alcohol. Processes have been described in which the carboxymethylcellulose is precipitated from the reaction mass in the form of an insoluble salt by addition to the reaction mass of an aluminum salt such as alum and the insoluble salt then later converted to a water soluble salt by treatment with sodium hydroxide. A process for preparing carboxymethylcellulose has also been described in which the cellulose is reacted with acrylonitrile in the presence of an alkali. The carboxymethylcellulose is sometimes referred to as cellulose glycollic acid and its salts as cellulose glycollates. The water soluble salts of carboxymethylcellulose are odorless and tasteless and otherwise unobjectionable as ingredients in foodstuffs. They are unaffected by the ingredients commonly used in ice cream and are highly stable to changes in pH of their environment. They are ordinarily available in the form of a dry granular powder.

Only small proportions of the soluble salts of carboxymethylcellulose are required to produce a marked improvement in the texture of the completed ice cream. Ordinarily they will be included in the conventional ice cream mix in amounts ranging from 0.1% to 0.3% of the total weight of the composition. I have obtained the best results with about 0.2%, when using a sodium salt of carboxymethylcellulose having a viscosity of about 1500 centipoises in 1% aqueous solution with an ice cream mix of 10%–12% butter fat content. However, the least amount of the compound when included in the ice cream will produce a proportionately small but nevertheless desirable improvement in texture over ice cream containing no stabilizer. Amounts greater than 0.3% will not ordinarily give any significant improvement in texture over and above that which is produced by 0.3% or less. The exact amount to be used will vary somewhat with the viscosity of the particular carboxymethylcellulose which is used. It is preferable to use a high viscosity cellulose derivative and the numerical proportions given above are based on the use of a carboxymethylcellulose having a viscosity of the order of 1500 centipoises in 1% aqueous solution. The amount of the carboxymethylcellulose required to produce a satisfactory texture will also vary with the butter fat content of the ice cream. If the butter fat content is 10%, satisfactory results will be obtained with 0.1% to 0.2% of the cellulose material. However, if the butter fat content is raised to 12½% the amount may be reduced to 0.05 to 0.15%. For ices and sherbets I prefer to use about 0.1% to 0.3% of the cellulose derivative. The worker skilled in the art can readily determine by trial the amount to be added to give the texture desired. No more should be used than is required to give the optimum texture.

Because of the very small amounts of the cellulose derivative which are required, it will not ordinarily be convenient for the ice cream manufacturer to measure out the proper amount for a given batch with sufficient accuracy. For this reason it is preferred to include a bulking or extending material in the stabilizing and texture-improving composition as it is sold on the market for use by the manufacturer. For this purpose I have found that a sugar such as dextrose, sucrose or glucose or table salt may be used. Flours produced from the common cereal grains, such as wheat flour, oat flour, corn flour, etc. are also effective as extenders. The proportion of extender is not of importance provided the extender is present in sufficient amount so that the small quantities of the stabilizing material which the manufacturer will require can be conveniently measured out. Generally about 60 to 80% of the composition should consist of the extender. In general any material which is edible and which is innocuous in ice cream can be used as an extender and the term "extender" will be used hereinafter to designate materials meeting these requirements.

I have found that the inclusion of relatively small proportions of certain mono or diglycerides in ice cream mixes containing a water soluble salt of carboxymethylcellulose does not adversely affect the improvement in texture of the ice cream caused by the addition of the salt of carboxymethylcellulose. At the same time the yield or overrun is enhanced to a degree comparable with that obtained with the mono or diglyceride is used with texture-improving materials of the nature of gelatin or algin. Among the glycerides which are effective to improve the overrun when used with the water-soluble salts of carboxymethylcellulose are the mono and diglycerides of the higher fatty acids. Satisfactory results have been obtained with the monoglycerides of stearic, oleic, palmitic, lauric, butyric and linoleic acids, and with the diglycerides of stearic, oleic or palmitic acids.

Even better results have been obtained with the mixed glyceryl diesters disclosed in the copending application of Bernard Nelson, Serial No. 568,209, filed on the same day as the present application. These mixed diesters are mixed diglycerides of two different acids, one of which is a higher fatty acid and the other of which is an aromatic carboxylic acid. These mixed diglycerides are esters of glycerol and two different organic acids in which one of the hydroxyl groups of the glycerol remains free and unesterified. The fatty acid may be any of the naturally-occurring higher fatty acids found in the natural animal and vegetable oils and fats, such as tallow, butter fat, coconut oil, olive oil, cottonseed oil, hog lard, beef fat, and other edible fats and oils. These fatty acids are typified by stearic acid, oleic acid, palmitic acid, and linoleic acid, with each of which satisfactory results have been obtained.

Satisfactory results have been obtained when an aromatic carboxylic acid such as benzoic acid, naphthenic acid and salicylic acid has been used to supply the aromatic carboxylic constituent of the mixed glyceryl diester used in the process. Any other aromatic carboxylic acid that will form mixed diesters of glycerol and which does not contribute objectionable color, odor or other undesirable characteristic to the resulting diester may be employed in forming mixed diesters useful for the purposes herein described. A more detailed description of these mixed glyceryl diesters will be found in the copending application referred to above.

The amount of the glyceride required to produce satisfactory results is very small. For most ice creams 0.1% to 0.2%, based on the weight of the entire mix, is sufficient, but more or less than this amount may be used depending upon the overrun desired. I prefer to include the glyceride in the mixture of the cellulose derivative and its extender to form a stabilizing and texture-improving agent suitable for sale to the ice cream manufacturer. Generally, in this case, the mixture should contain approximately one-half as much glyceride as cellulose derivative, by weight.

The invention will be more fully understood from the following example, in which the proportions are by weight:

*Example*

A stabilizing and texture-improving agent suitable for sale to the ice cream manufacturer is made by thoroughly mixing together in a dry state:

| | Parts |
|---|---|
| Sodium carboxymethylcellulose [1] | 30 |
| Glycerol α-stearate-γ-benzoate | 15 |
| Cane sugar | 55 |

[1] Viscosity, in 1% aqueous solution, approximately 1500 cps. Supplied by Hercules Powder Company.

1 part of this mixture is added to 200 parts of a conventional ice cream mix having a butter fat content of 10% and the mix homogenized and then passed through a continuous type ice cream freezer. The frozen produce scored as to texture far superior to the ice creams commonly available.

It will be appreciated that the amount of the stabilizing and texture-improving agent will be varied to suit the particular ice cream mix to be processed. Thus, when working with ice cream mixes of approximately 13% butter fat content, it was found that only 0.1% (corresponding to 0.7 part on the basis used in the example) of the particular stabilizing agent disclosed in the example was required to produce a texture approximately the same as that of the product of the example.

The preparation of the carboxymethylcellulose material is no part of the present invention and materials manufactured in any manner may be employed in accordance with my invention. Any of the water-soluble salts of carboxymethylcellulose may be used. Thus the potassium salt is equally as suitable as the sodium salt of the example. Salts of carboxymethylcellulose with metals which ordinarily produce water-insoluble compounds may be prepared under carefully controlled conditions to yield water-soluble derivatives. Such materials, because of their water solubility, are suitable for use in the present invention.

The present invention is equally applicable to the manufacture of ices and sherbets and it will be understood that the term "ice cream" as used herein is intended to include these materials as well as ice cream.

I claim:

1. A composition for improving the texture of ice cream comprising a water-soluble salt of carboxymethylcellulose and a mixed glycerol diester of a higher fatty acid and an aromatic carboxylic acid.

2. A composition for improving the texture of ice cream comprising a water-soluble salt of carboxymethylcellulose and a mixed glycerol diester of a higher fatty acid and benzoic acid.

3. A composition for improving the texture of ice cream suitable for addition to an ice cream mix by the ice cream manufacturer comprising a water-soluble salt of carboxymethylcellulose, an innocuous edible extender and a mixed glycerol diester of a higher fatty acid and an aromatic carboxylic acid.

4. A composition for improving the texture of ice cream suitable for addition to an ice cream mix by the ice cream manufacturer comprising a water-soluble salt of carboxymethylcellulose, an innocuous edible extender and a mixed glycerol diester of a higher fatty acid and benzoic acid.

5. An ice cream mix adapted upon freezing to yield an ice cream of smooth, fine-grained texture comprising the combination with ice cream-forming ingredients of a water-soluble salt of carboxymethylcellulose and a mixed glycerol diester of a higher fatty acid and an aromatic carboxylic acid.

6. An ice cream mix adapted upon freezing to yield an ice cream of smooth, fine-grained texture comprising the combination with ice cream-forming ingredients of a water-soluble salt of carboxymethylcellulose and a mixed glycerol diester of a higher fatty acid and benzoic acid.

7. The method of making an ice cream of smooth, fine-grained texture which comprises incorporating in an unfrozen ice cream mix a water soluble salt of carboxymethylcellulose and a mixed glycerol diester of a higher fatty acid and an aromatic carboxylic acid.

8. The method of making an ice cream of smooth, fine-grained texture which comprises incorporating in an unfrozen ice cream mix a water soluble salt of carboxymethylcellulose and a mixed glycerol diester of a higher fatty acid and benzoic acid.

9. An ice cream of improved smooth and fine-grained texture characterized by the presence therein of a water-soluble salt of carboxymethylcellulose and a mixed glycerol diester of a higher fatty acid and an aromatic carboxylic acid.

10. An ice cream of improved smooth and fine-grained texture characterized by the presence therein of a water-soluble salt of carboxymethylcellulose and a mixed glycerol diester of a higher fatty acid and benzoic acid.

MANFRED LANDERS.

REFERENCES CITED

The following references are of record in the file of this patent:

UNITED STATES PATENTS

| Number | Name | Date |
|---|---|---|
| 2,065,398 | Roth et al. | Dec. 22, 1936 |
| 2,264,593 | Schapiro | Dec. 2, 1941 |
| 2,355,547 | Musher | Aug. 8, 1944 |
| 2,395,061 | Musher | Feb. 19, 1946 |

OTHER REFERENCES

"Metal Cellulose Glycollate" and "Sodium Cellulose Glycollate in Chemical and Metallurgical Engineering," March, 1944, pages 139-149.

Industrial and Engineering Chemistry, Sept. 1937, "Water Soluble Ethers," by L. H. Bock, page 985.